US009874728B1

(12) United States Patent
Zhong et al.

(10) Patent No.: US 9,874,728 B1
(45) Date of Patent: Jan. 23, 2018

(54) LONG WORKING DISTANCE LENS SYSTEM, ASSEMBLY, AND METHOD

(71) Applicant: General Electric Company, Schenectady, NY (US)

(72) Inventors: Zhangyi Zhong, South San Francisco, CA (US); Kevin George Harding, Niskayuna, NY (US); Daniel Curtis Gray, Cumberland, ME (US); Yi Liao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 70 days.

(21) Appl. No.: 14/990,998

(22) Filed: Jan. 8, 2016

(51) Int. Cl.
G02B 13/00 (2006.01)
G02B 9/12 (2006.01)
(52) U.S. Cl.
CPC ........... *G02B 13/0095* (2013.01); *G02B 9/12* (2013.01)
(58) Field of Classification Search
CPC .............................. G02B 13/0095; G02B 9/12
USPC ........................................................ 359/362
See application file for complete search history.

(56) References Cited

U.S. PATENT DOCUMENTS

| 4,206,974 | A | 6/1980 | Maeda |
| 4,426,136 | A | 1/1984 | Hirose |
| 4,540,248 | A | 9/1985 | Togino |
| 4,610,515 | A | 9/1986 | Tanaka |
| 5,748,372 | A | 5/1998 | Kitagawa |
| 6,069,744 | A | 5/2000 | Kusaka et al. |
| 6,297,503 | B1 | 10/2001 | Bindell et al. |
| 6,469,835 | B1 | 10/2002 | Liu |
| 6,577,387 | B2 | 6/2003 | Ross, III et al. |
| 6,721,094 | B1 | 4/2004 | Sinclair et al. |
| 6,842,298 | B1 | 1/2005 | Shafer et al. |
| 6,943,966 | B2 * | 9/2005 | Konno ................... G02B 7/023 359/813 |
| 6,997,679 | B2 | 2/2006 | Beddard et al. |
| 7,034,271 | B1 | 4/2006 | Sinclair et al. |
| 7,116,497 | B2 | 10/2006 | Endo |

(Continued)

FOREIGN PATENT DOCUMENTS

CN         101063743 A      10/2007

OTHER PUBLICATIONS

Wolfgang Alt "An objective lens for efficient fluorescence detection of single atoms", Optik—International Journal for Light and Electron Optics, ScienceDirect, vol. 113, Issue: 3, pp. 142-144, 2002.

(Continued)

*Primary Examiner* — Frank Font
(74) *Attorney, Agent, or Firm* — Nitin N. Joshi

(57) ABSTRACT

A lens system includes a tube lens and a lens assembly, with the tube lens disposed between an optical sensor and the lens assembly. The lens assembly is disposed between the tube lens and an imaged object. In order to solve the problem of some lens systems having focal lengths that are shorter than the working distances of the lens systems, one aspect of the inventive subject matter described herein provides the lens assembly with a negative lens and plural positive lenses. A first positive lens is located between a second positive lens and an imaging plane, the second positive lens is located between the first positive lens and the negative lens, and the negative lens is located between the second positive lens and the tube lens.

12 Claims, 3 Drawing Sheets

(56) References Cited

U.S. PATENT DOCUMENTS

| | | | |
|---|---|---|---|
| 7,476,873 B2 | 1/2009 | Hayashi | |
| 7,502,177 B2 | 3/2009 | Shafer et al. | |
| 7,817,275 B2 | 10/2010 | Cloutier | |
| 8,523,524 B2 | 9/2013 | Benson et al. | |
| 8,624,967 B2 | 1/2014 | O'Connell et al. | |
| 8,915,713 B2 | 12/2014 | Boyer | |
| 2002/0197020 A1 | 12/2002 | Qian et al. | |
| 2003/0043289 A1* | 3/2003 | Konno | G02B 7/023 348/335 |
| 2003/0053219 A1* | 3/2003 | Manzi | A61F 9/00836 359/676 |
| 2005/0153559 A1 | 7/2005 | Shafer et al. | |
| 2007/0171547 A1 | 7/2007 | Shafer et al. | |
| 2008/0218756 A1 | 9/2008 | Cloutier | |
| 2010/0208203 A1 | 8/2010 | Sarver | |
| 2011/0235192 A1* | 9/2011 | Uzawa | A61B 1/00096 359/785 |

OTHER PUBLICATIONS

Dasgupta R. et al, "Optical trapping with low numerical aperture objective lens", Photonics Global Conference (PGC), 2012, pp. 1-4, Dec. 13-16, 2012, Singapore.

Ohara Inc. product summary for S-LAH55V, S-LAH65V, S-TIM22, PBH56, and S-FPL53.

\* cited by examiner

LONG WORKING DISTANCE LENS SYSTEM, ASSEMBLY, AND METHOD

FIELD

The subject matter described herein relates to lens systems, such as systems having lenses with long working distances.

BACKGROUND

Lens systems are used to more clearly view surfaces of objects by magnifying views of the surfaces. The systems may include one or more lenses that change the focus of light by refracting the light. The lenses may converge or diverge the light in order to magnify views of the surfaces. For example, microscopes may be used to magnify very small objects and allow a human operator to view the small objects that would otherwise be impossible for the operator to view.

Equipment such as turbines may have very small objects that need to be viewed in order to check on the status and/or sizes of the objects. For example, geometry dimensions of cooling holes in turbine or airfoil blades are important to ensure cooling efficiency of the airfoils. The ability to measure dimensional parameters of the cooling holes can help improve the manufacturing process of the cooling holes and airfoil blades.

Currently, there is no known reliable measurement system to verify the dimensions of cooling holes in order to ensure that the dimensions are within desired ranges or sizes. In order to obtain high resolution images of the cooling holes, short focal length objective lenses are needed to achieve sufficient magnification. But, the working distances of known short focal length objective lenses are limited. In order to measure the cooling holes on larger airfoil blades and nozzles, a relatively large standoff distance (e.g., a distance between the object being viewed and the lens) may be needed due to obstruction of other components of the turbines that include the airfoil blades and nozzles. For example, at least a 70 millimeter or other standoff distance may be required. However, in order to maintain the resolution required in the image formed by the lens, a high numerical aperture (e.g., the sine of the cone angle of light collected) also may be needed. That is, the ability of a lens to produce an image of a particular size feature is inherently limited by the cone angle of rays of the light diffracted by a given size feature. A wider collection cone angle provides information to resolve a smaller size feature. This effect, diffraction limit, is well known in the field of optics. There are no currently known objective lenses having sufficiently long working distances and sufficiently high numerical aperture that can provide the physical standoff, the image resolution and magnification needed to view the geometric dimensions of cooling holes in airfoil blades.

BRIEF DESCRIPTION

In one embodiment, a lens system includes a first lens receiving light received off of a viewed object, a second lens converging the light diverged by the first lens, and a third lens focusing the light converged by the second lens toward an optical sensor. A combination of the first, second, and third lenses has a working distance that is longer than a focal length of a combination of the first lens and the second lens.

In one embodiment, a method includes receiving light from a viewed object at a first lens, focusing the light with the first lens toward a second lens, focusing the light with the second lens toward a third lens, and diverging the light with the third lens toward a tube lens. A combination of the first, second, and third lenses has a working distance that is longer than a focal length of a combination of the first lens and the second lens.

In one embodiment, a lens system includes a first positive lens converging light received off of a viewed object, a second positive lens converging the light from the first positive lens, and a negative lens diverging the light received from the second positive lens toward a tube lens and an optical sensor. A combination of the negative lens and the first and second positive lenses has a working distance that is longer than a focal length of a combination of the first lens and the second lens.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
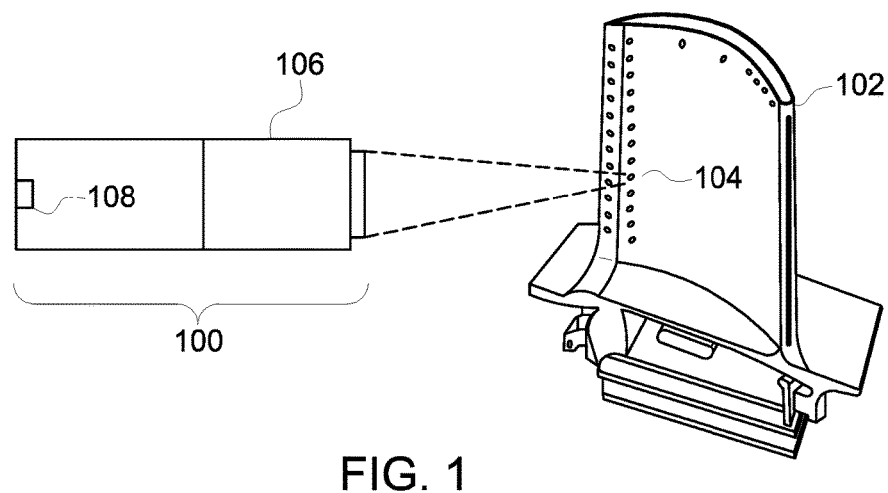
FIG. 1 schematically illustrates a long working distance lens system and a target object according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to turbines and airfoil blades, embodiments of the inventive subject matter are also applicable for use with other objects generally, such as other objects that may require a long working distance for a lens to be able to magnify surfaces of the objects for viewing.

FIG. 1 schematically illustrates a long working distance lens system 100 and a target object 102 according to one embodiment. The target object 102 is an airfoil blade having several cooling holes 104 extending into or through the airfoil blade. The cooling holes 104 may be relatively small, such as being holes having a diameter of less than one-half millimeter (or another size). The lens system 100 may magnify light in order to provide high resolution images of viewed objects, such as the cooling holes 104, to allow a human operator to examine the dimensions of the cooling holes 104. The cooling holes 104 may be referred to herein as viewed objects, but the lens system 100 is not limited to viewing only cooling holes 104. Other objects may be viewed using the lens system 100.

The lens system 100 provides high resolution images of the viewed objects using an objective lens in an infinity-conjugate microscope system. The lens system 100 includes an outer housing 106 with lenses (shown and described below) included therein. The lens system 100 also includes an optical sensor 108, such as a camera, that generates magnified images of the viewed objects as an output of the lens system 100. The images may be communicated to an output device (not shown), such as an electronic display.

Figure 2:
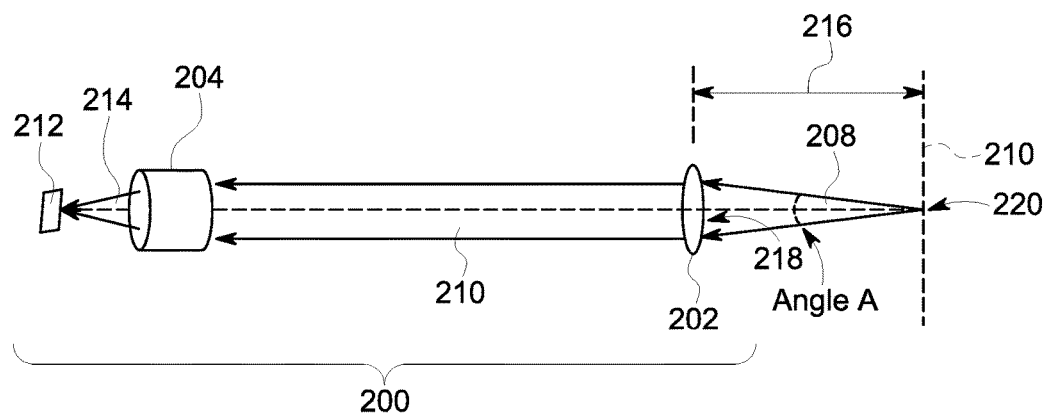
FIG. 2 illustrates a schematic view of a lens system according to one example.

FIG. 2 illustrates a schematic view of a lens system 200 according to one example. The lens system 200 may represent an infinity-conjugate microscope system having an objective lens 202 ("Simple Objective" in FIG. 2) and a tube lens 204. The lens system 200 can represent one type of system that may be used to magnify images of objects. The objective lens 202 receives light 208 in a cone angle "A" of light 208 from a viewed object located in or at an imaging plane 210. The numerical aperture of the lens 202 is the sine of the angle A. The objective lens 202 collimates the light 208 such that the light 208 becomes collimated light 210. The tube lens 204 focuses the collimated light 210 to an optical sensor 212 ("Camera Sensor" in FIG. 2), such as a camera, as focused light 214. The objective lens 202 has a focal length $f_o$ and the tube lens 204 has a focal length $f_t$. The magnification of the lens system 200 is a ratio of the tube lens focal length ($f_t$) over the focal length of the objective lens ($f_o$) or $f_t/f_o$.

In order to view small objects, such as the objects 104 shown in FIG. 1, the lens system 200 may need to be relatively far from the objects 104. Cooling holes are often buried or view of the cooling holes is obstructed by other mechanical parts. As a result, a working distance 216 of the objective lens 202 may need to be longer than the focal length ($f_o$) of the objective lens 202, which may be determined based on the needed magnification for viewing the target object 104. The working distance of a lens (e.g., the objective lens 202) may be the distance between an outer or last surface 218 of the lens 202 and a focal point 220 of the lens, which may be on the viewed object 104.

The focal length ($f_t$) of the tube lens 204 may be restricted, such as by being fixed and unchangeable. As a result, the focal length ($f_o$) of the objective lens 202 can be short in order to achieve high magnification. But, the objective lens 202 may have a working distance 216 that is longer than the focal length ($f_o$) of the objective lens 202. If the working distance 216 is longer than the focal length ($f_o$), then the lens system 200 may be unable to focus on the viewed object 104. This can limit how short the focal length ($f_o$) of the objective lens 202 can be. For example, for longer working distances 216 (such as those that occur in viewing cooling holes on airfoils, which can be at least 30 millimeters, 34 millimeters, or up to 70 millimeters), the focal length ($f_o$) of the objective lens 202 may need to be at least as long as the working distance 216. This can prevent lens systems such as the lens system 200 from being able to magnify the cooling holes in airfoils or other objects requiring a working distance 216 that is longer than the focal length ($f_o$) of the objective lens 202.

Figure 3:
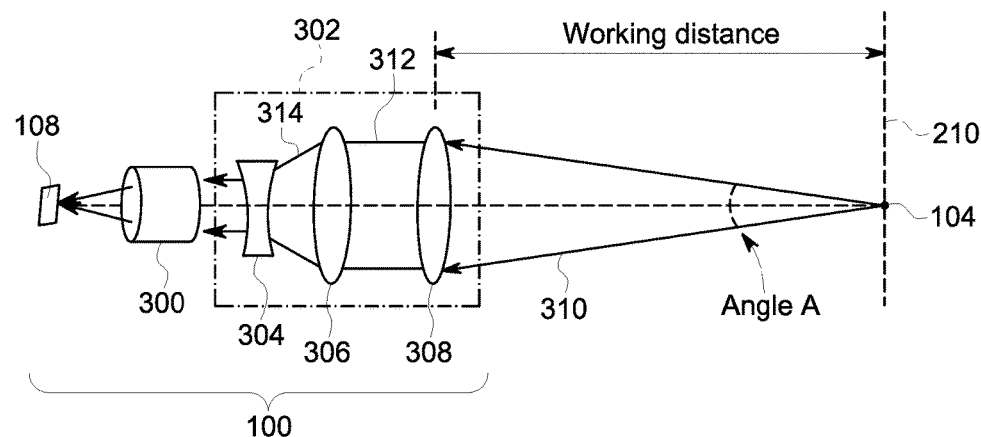
FIG. 3 illustrates a schematic of one embodiment of the lens system shown in FIG. 1.

FIG. 3 illustrates a schematic of one embodiment of the lens system 100 shown in FIG. 1. The lens system 100 includes a tube lens 300 and a lens assembly 302, with the tube lens 300 disposed between the optical sensor 108 ("Camera Sensor" in FIG. 3) and the lens assembly 302. The lens assembly 302 is disposed between the tube lens 300 and the imaged object 104, which may be located at or in the imaging plane 210 ("Object/target plane" in FIG. 3). In order to solve the problem of some lens systems having focal lengths that are shorter than the working distances of the lens systems, one aspect of the inventive subject matter described herein provides the lens assembly 302 with a negative lens 304, a first positive lens 308, and a second positive lens 306. The first positive lens 308 is located between the second positive lens 306 and the imaging plane 210, the second positive lens 306 is located between the first positive lens 308 and the negative lens 304, and the negative lens 304 is located between the second positive lens 306 and the tube lens 300.

Light 310 within a cone angle A is received from the viewed object 104 by the first positive lens 308 in the lens assembly 302. The positive lenses 308, 306 focus the light 310 as focused light 312 that is directed toward the negative lens 304. The negative lens 304 diverges the light 312 coming from the positive lens 306 to form light 314 directed toward the tube lens 300. The light 314 is focused by the tube lens 300 onto or toward the sensor 108.

In operation, negative lens 304 provides negative field curvature to compensate the positive field curvature introduced by the positive lenses 306, 308. The second positive lens 306 is a bi-convex element to help to re-converge the light. The lens system 100 can have a variety of operational parameters that allow for imaging very small objects 104 from much longer working distances 316. For example, the focal length of the lens system 100 may be forty mm or another value. Alternatively, the focal length may be between thirty-five mm and forty-five mm (inclusive), between thirty mm and fifty mm (inclusive), etc. The numerical aperture (NA) of the lens system 100 may be 0.14. Alternatively, the NA may be another value, such as 0.1 to 0.2 (inclusive), 0.05 to 0.25 (inclusive), etc. The working distance of the lens system 100 may be relatively large, such as seventy mm. Alternatively, the working distance may be between sixty mm and eighty mm (inclusive), between fifty mm and ninety mm (inclusive), or the like. A diameter of the lens system 100 and/or the largest of the lenses 304, 306, 308 may be twenty-six mm or another value, such as between twenty mm and thirty mm (inclusive) or another size. The field of view of the lens system 100 may be 2.88 mm by 2.17 mm, with a 3.62 mm diagonal distance. Alternatively, the lens system 100 may have another field of view, such as between 2.5 mm and 3.1 mm by 1.8 mm and 2.5 mm (or other values, inclusive) with a diagonal distance of between 3.5 and 3.75 mm (inclusive), or other values.

Figure 4:
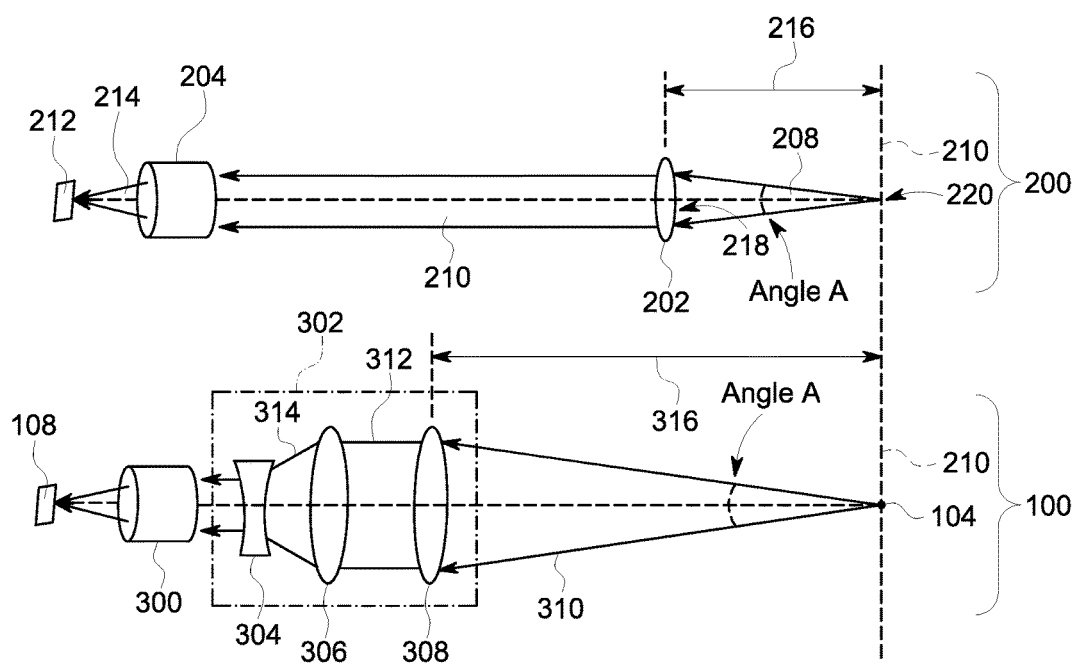
FIG. 4 illustrates a comparison of the lens systems shown in FIGS. 2 and 3 according to one example.

FIG. 4 illustrates a comparison of the lens systems 100, 200 shown in FIGS. 2 and 3 according to one example. As shown in FIG. 4, the combination of the positive lenses 306, 308 and negative lens 304 in the lens system 100 extends the working distance of the lens system. For example, the working distance 216 of the lens system 200 may be extended to the working distance 316 of the lens system 300, while using the same sensor 212 as the sensor 108 and/or the same tube lens 204 as the tube lens 300, without reducing the magnification of the lens system 100 relative to the magnification of the lens system 200. The working distance 316 of the lens system 100 can be extended beyond the focal length ($f_O$) of the objective lens 202 of the lens system 200 to allow for the lens system 100 to be disposed farther from the imaged object 104, while producing the same magnification of the imaged object 104 as the lens system 200.

Figure 5:
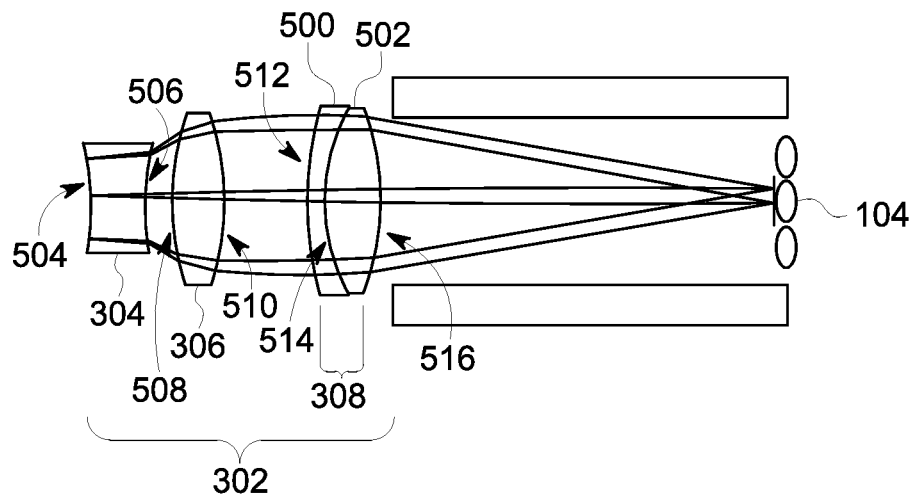
FIG. 5 illustrates another view of the lens assembly shown in FIG. 3 according to one embodiment.

FIG. 5 illustrates another view of the lens assembly 302 shown in FIG. 3 according to one embodiment. In the illustrated embodiment, the first positive lens 308 may be formed from multiple lens elements 500, 502 that are coupled with each other such that the lens elements 500, 502 directly abut each other. The positive lens elements 500, 502 may be adhered or cemented together, with the lens elements 500, 502 providing both a high refractive index and a low dispersion of the light, which can compensate for chromatic aberration. The lens elements 500, 502 may have the same or similar coefficients of thermal expansion (e.g., the difference in the coefficients may be no greater than $65 \times 10^{-7}$ per degree Celsius or another value) to avoid cracking of the lens elements 500, 502 during changes in temperature. Alternatively, the first positive lens 308 may be formed as a single body and not multiple lens elements. The lenses 304, 306, 308 and lens elements 500, 502 may have different curvatures and/or thicknesses of different surfaces 504, 506, 508, 510, 512, 514, 516.

A back surface 504 of the negative lens 304 may be the surface of the lens 304 that faces the sensor 108 (shown in FIG. 1). This back surface 504 of the negative lens 304 may have a negative radius of curvature (e.g., a concave shape as seen from the sensor 108 or from the left side of FIG. 5). The radius of curvature of the back surface 504 may be −0.025243 meters (m) or another value (e.g., −0.02524 m, −0.0252 m, −0.025 m, −0.03 m, etc.). In another example, the radius of curvature of the back surface 504 may be smaller than zero but greater than −0.05 m. As another example, the radius of curvature of the back surface 504 may be between −0.01 m and −0.04 m (inclusive), between −0.02 m and −0.03 m (inclusive), or another value.

The thickness of the back surface 504 of the negative lens 304 may be ten millimeters. Alternatively, the thickness of the back surface 504 of the negative lens 304 may be between five and fifteen mm (inclusive), between six and fourteen mm (inclusive), between seven and thirteen mm (inclusive), between eight and twelve mm (inclusive), between nine and eleven mm (inclusive), etc. The thickness of the back surface 504 can represent the portion of the negative lens 304 extending inward from the back surface 504 having the same radius of curvature. Alternatively, the thickness can represent the portion of the negative lens 304 extending inward from the back surface 504 that is formed from the same material.

An opposite, front surface 506 of the negative lens 304 may be the surface of the lens 304 that faces away from the sensor 108 and/or that faces the second positive lens 306. This front surface 506 of the negative lens 304 may have a positive radius of curvature (e.g., a concave shape as seen from the second positive lens 306 or from the right side of FIG. 5). The radius of curvature of the front surface 506 may be +0.044873 m or another value (e.g., +0.04487 m, +0.0449 m, +0.045 m, +0.04 m, etc.). In another example, the radius of curvature of the front surface 506 may be larger than zero but smaller than +0.05 m. As another example, the radius of curvature of the front surface 506 may be between +0.03 m and +0.05 m (inclusive), between +0.02 m and +0.06 m (inclusive), or another value.

The thickness of the front surface 506 of the negative lens 304 may be no greater than six millimeters. As one example, the thickness of the front surface 506 may be 5.775 millimeters. Alternatively, the thickness of the front surface 506 of the negative lens 304 may be between five and six mm (inclusive), between four and seven mm (inclusive), between three and eight mm (inclusive), between two and nine mm (inclusive), etc. The thickness of the front surface 506 can represent the portion of the negative lens 304 extending inward from the front surface 506 having the same radius of curvature. Alternatively, the thickness can represent the portion of the negative lens 304 extending inward from the front surface 506 that is formed from the same material.

A rear surface 508 of the second positive lens 306 may be the surface of the lens 306 that faces the front surface 506 of the negative lens 304. This rear surface 508 of the second positive lens 306 may have a positive radius of curvature (e.g., a convex shape as seen from the negative lens 304 or from the left side of FIG. 5). The radius of curvature of the rear surface 508 may be +0.021252 m or another value (e.g., +0.02125 m, +0.0213 m, +0.021 m, +0.02 m, etc.). In another example, the radius of curvature of the rear surface 508 may be greater than zero but less than +0.03 m. As another example, the radius of curvature of the rear surface 508 may be between +0.01 and +0.03 m (inclusive).

The thickness of the rear surface 508 of the second positive lens 306 may be no greater than nine millimeters. For example, the thickness may be 8.6 millimeters. Alternatively, the thickness of the rear surface 508 of the second positive lens 306 may be between eight and nine mm (inclusive), between seven and ten mm (inclusive), between six and eleven mm (inclusive), between five and twelve mm (inclusive), between four and thirteen mm (inclusive), etc. The thickness of the rear surface 508 can represent the portion of the second positive lens 306 extending inward from the rear surface 508 having the same radius of curvature. Alternatively, the thickness can represent the portion of the second positive lens 306 extending inward from the rear surface 508 that is formed from the same material.

An opposite, front surface 510 of the second positive lens 306 may be the surface of the lens 306 that faces away from the negative lens 304 and/or that faces the first positive lens 308. This front surface 510 of the second positive lens 306 may have a negative radius of curvature (e.g., a concave shape as seen from the negative lens 304 or from the left side of FIG. 5). The radius of curvature of the rear surface 318 may be −0.033147 m or another value (e.g., −0.03315 m, −0.0331 m, −0.033 m, −0.03 m, etc.). In another example, the radius of curvature of the front surface 510 may be smaller than zero but larger than −0.03 m. As another example, the radius of curvature of the front surface 510 may be between −0.02 m and −0.04 m (inclusive), between −0.01 m and −0.05 m (inclusive), or another value.

The thickness of the front surface 510 of the second positive lens 306 may be no greater than fifteen mm. As one example, the thickness of the front surface 510 may be 14.646 mm. Alternatively, the thickness of the front surface 510 may be between fourteen and fifteen mm (inclusive), between thirteen and sixteen mm (inclusive), between twelve and seventeen mm (inclusive), between eleven and eighteen mm (inclusive), etc. The thickness of the front surface 510 can represent the portion of the second positive lens 306 extending inward from the front surface 510 having the same radius of curvature. Alternatively, the thickness can represent the portion of the second positive lens 306 extending inward from the front surface 510 that is formed from the same material.

A rear surface 512 of the first positive lens 308 may be the surface of the lens 308 that faces the front surface 510 of the second positive lens 306. The rear surface 512 may be the rear surface 512 of the lens element 500 of the first positive lens 308. This rear surface 512 may have a positive radius of curvature (e.g., a convex shape as seen from the second positive lens 306 or from the left side of FIG. 5). The radius of curvature of the rear surface 512 may be +0.024629 m or another value (e.g., +0.02463 m, +0.0246 m, +0.025 m, +0.02 m, etc.). In another example, the radius of curvature of the rear surface 512 may be greater than zero but less than +0.02 m. As another example, the radius of curvature of the rear surface 512 may be between +0.01 and +0.03 m (inclusive), greater than zero and no less than +0.04 m, or another radius.

The thickness of the rear surface 512 may be three millimeters. Alternatively, the thickness of the rear surface 512 may be between two and four mm (inclusive), between one and five mm (inclusive), etc. The thickness of the rear surface 512 can represent the portion of the first positive lens 308 extending inward from the rear surface 512 having the same radius of curvature. Alternatively, the thickness can represent the portion of the first positive lens 308 extending inward from the rear surface 512 that is formed from the same material.

A rear surface 514 of the lens element 502 of the first positive lens 308 faces the lens element 500 and may abut the lens element 500. The rear surface 514 can have a positive radius of curvature (e.g., a convex shape as seen from the second positive lens 306 or from the left side of FIG. 5). The radius of curvature of the rear surface 514 may be +0.045809 m or another value (e.g., +0.04581 m, +0.0458 m, +0.046 m, +0.05 m, etc.). In another example, the radius of curvature of the rear surface 514 may be between +0.04 m and +0.05 m (inclusive), between +0.03 m and +0.06 m (inclusive), between +0.02 m and +0.06 m (inclusive), between +0.01 m and +0.07 m (inclusive), or another radius.

The thickness of the rear surface 514 may be ten millimeters. Alternatively, the thickness of the rear surface 514 may be between nine and eleven mm (inclusive), between eight and twelve mm (inclusive), between seven and thirteen mm (inclusive), etc. The thickness of the rear surface 514 can represent the portion of the lens element 502 extending inward from the rear surface 514 having the same radius of curvature. Alternatively, the thickness can represent the portion of the lens element 502 extending inward from the rear surface 514 that is formed from the same material.

An opposite, front surface 516 of the lens element 502 may be the surface of the first positive lens 308 that faces away from the second positive lens 306 and/or that faces the imaged object 104. The front surface 516 may have a negative radius of curvature (e.g., a concave shape as seen from the second positive lens 306 or from the left side of FIG. 5). The radius of curvature of the front surface 516 may be −0.033913 m or another value, such as −0.03391 m, −0.0339 m, −0.034 m, −0.03 m, etc. In another example, the radius of curvature of the front surface 516 may be less than zero but greater than −0.03 m. As another example, the radius of curvature of the front surface 516 may be between −0.02 m and −0.04 m (inclusive), between −0.01 m and −0.05 m (inclusive), or the like.

The thickness of the front surface 516 may be no greater than seventy millimeters. For example, the thickness may be 69.839 millimeters. Alternatively, the thickness of the front surface 516 may be between sixty-eight and seventy mm (inclusive), between sixty and eighty mm (inclusive), etc. The thickness of the front surface 516 can represent the portion of the positive lens 308 extending inward from the front surface 516 having the same radius of curvature. Alternatively, the thickness can represent the portion of the positive lens 308 extending inward from the front surface 516 that is formed from the same material.

The lenses 304, 306, 308 may be formed from a variety of light transmissive materials. The negative lens 304 can be formed from a high index glass (e.g., having a refractive index of at least 1.7 or between 1.7 and 1.9, or another value) and a median Abbe number ($V_d$) between thirty and fifty (exclusive of thirty and fifty), or another value (e.g., between twenty and sixty). The lens element 500 of the first positive lens 308 may be formed from a high index element (e.g., having a refractive index of at least 1.7 or between 1.7 and 1.9, or another value). The lens element 502 of the first positive lens 308 can be formed from a material having low light dispersion (e.g., having an Abbe number greater than 70 or another value). Alternatively, one or more other materials may be used to form one or more of the lenses or lens elements.

In one embodiment, the lens system 100 may image the objects 104 without use of a vacuum within the lens system 100 and/or without the objects 104 and/or lens system 100 being inside a vacuum (or any part of the lens system 100 being in a vacuum). The lens system 100 may image the objects 104 without reflecting the light off of any surfaces. For example, upon receipt of the light off of the object 104, the lens system 100 may not reflect the light in order to image the object 104. Alternatively, the lens system 100 may include one or more reflectors for reflecting light within the lens system 100.

Figure 6:
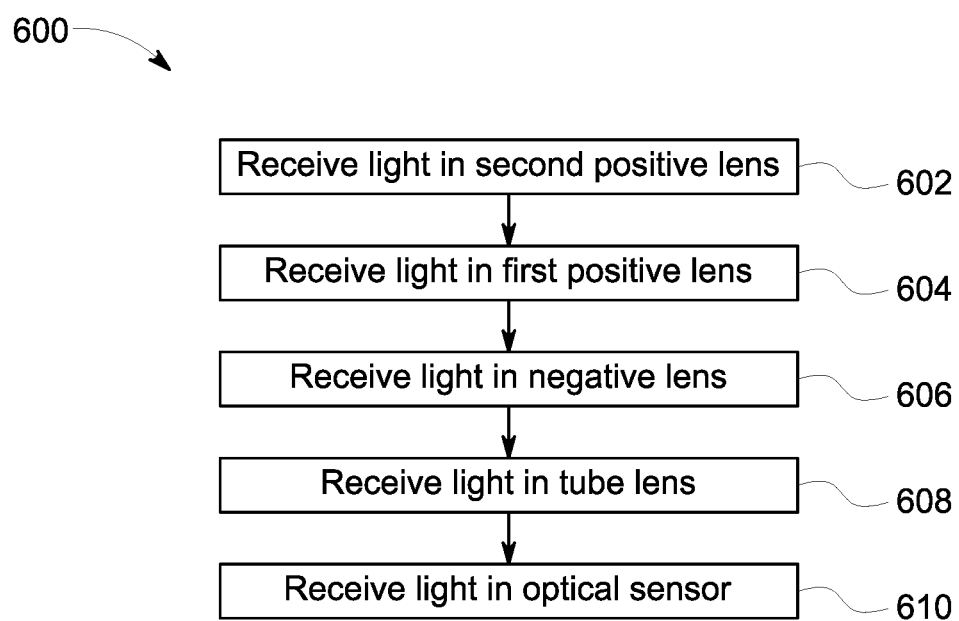
FIG. 6 illustrates a flowchart of one embodiment of a method for imaging a viewed object with a lens system having a working distance that is longer than a focal length of the lens system.

FIG. 6 illustrates a flowchart of one embodiment of a method 600 for imaging a viewed object with a lens system having a working distance that is longer than a focal length of the lens system. The method 600 may be performed with one or more embodiments of the lens system 100 described herein. At 602, light from a viewed object is received in a positive lens of the lens system. The light may be reflected off of or emanating from the object. This lens may include the first positive lens 308 shown in FIG. 3. At 604, the light is received in another positive lens after propagating through the prior positive lens. For example, the light may be received in the second positive lens 306 shown in FIG. 3. At 606, the light is received in and diverged by a negative lens. For example, the light may be received in the negative lens 304 shown in FIG. 3. This divergence increases the working distance of the lens system. At 608, the light is received in a tube lens. For example, the light may propagate through the negative lens and be received in the tube lens 300 shown in FIG. 3. At 610, the light is received at the optical sensor. The optical sensor may generate one or more images using the light that is received.

In one embodiment, a lens system includes a first lens receiving light received off of a viewed object, a second lens converging the light diverged by the first lens, and a third lens focusing the light converged by the second lens toward an optical sensor. A combination of the first, second, and third lenses has a working distance that is longer than a focal length of a combination of the first lens and the second lens.

In one aspect, the first lens is a positive lens having opposite convex surfaces.

In one aspect, the second lens is a positive lens having convex opposite front and rear surfaces.

In one aspect, the third lens is a negative lens having opposite front and rear surfaces, with one of the front or rear surfaces having a negative radius of curvature and another of the front or rear surfaces having a positive radius of curvature.

In one aspect, the first lens includes plural positive lens elements coupled together.

In one aspect, the plural positive lens elements include a second positive lens element and a first positive lens element. The second positive lens element can have a refractive index greater than 1.7 and the first positive lens element can have an Abbe number greater than 70.

In one aspect, the second lens has opposite front and rear surfaces with the front surface having a positive radius of curvature and the rear surface having a negative radius of curvature.

In one embodiment, a method includes receiving light from a viewed object at a first lens, focusing the light with the first lens toward a second lens, focusing the light with the second lens toward a third lens, and diverging the light with the third lens toward a tube lens. A combination of the first, second, and third lenses has a working distance that is longer than a focal length of a combination of the first lens and the second lens.

In one aspect, diverging the light includes receiving the light in a front surface of a negative lens having the front surface and an opposite rear surface with one of the front and rear surfaces having a negative radius of curvature and another of the front and rear surfaces having a positive radius of curvature.

In one aspect, converging the light with the second lens includes receiving the light through a convex rear surface of the first lens.

In one aspect, receiving the light at the first lens includes receiving the into plural lens elements of the first lens.

In one aspect, focusing the light with the first lens includes focusing the light with first and second positive lenses coupled with each other in the first lens.

In one aspect, focusing the light includes receiving the light into the second lens through a front surface having a positive radius of curvature.

In one embodiment, a lens system includes a first positive lens converging light received off of a viewed object, a second positive lens converging the light from the first positive lens, and a negative lens diverging the light received from the second positive lens toward a tube lens and an optical sensor. A combination of the negative lens and the first and second positive lenses has a working distance that is longer than a focal length of a combination of the first lens and the second lens.

In one aspect, the system also includes the tube lens between the negative lens and the optical sensor.

In one aspect, the first and second positive lenses each include opposite convex front and rear surfaces.

In one aspect, the negative lens includes opposite front and rear surfaces, with one of the front and rear surfaces having a negative radius of curvature and another of the front and rear surfaces having a positive radius of curvature.

In one aspect, the first positive lens is formed from plural lens elements coupled together.

In one aspect, the first positive lens has a refractive index greater than 1.7.

In one aspect, the first positive lens has an Abbe number greater than 70.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A method comprising:
   receiving light from a viewed object at a first lens;
   focusing the light with the first lens toward a second lens;
   focusing the light with the second lens toward a third lens; and
   diverging the light with the third lens toward a tube lens, wherein a combination of the first, second, and third lenses has a working distance that is longer than a focal length of a combination of the first lens and the second lens;
   wherein focusing the light with the first lens includes focusing the light with first and second positive lenses coupled with each other in the first lens.

2. The method of claim 1, wherein diverging the light includes receiving the light in a first surface of a negative lens having the first surface and an opposite second surface with one of the first and second surfaces having a negative radius of curvature and another of the first and second surfaces having a positive radius of curvature.

3. The method of claim 1, wherein focusing the light with the first lens toward the second lens includes receiving the light through a convex surface of the first lens.

4. The method of claim 1, wherein receiving the light at the first lens includes receiving the light into plural lens elements of the first lens.

5. The method of claim 1, wherein focusing the light includes receiving the light into the second lens through a surface having a positive radius of curvature.

6. A lens system comprising:
- a first positive lens converging light received off of a viewed object;
- a second positive lens converging the light from the first positive lens; and
- a negative lens diverging the light received from the second positive lens toward a tube lens and an optical sensor, wherein a combination of the negative lens and the first and second positive lenses has a working distance that is longer than a focal length of a combination of the first lens and the second lens.

7. The lens system of claim 6, further comprising the tube lens between the negative lens and the optical sensor.

8. The lens system of claim 6, wherein the first and second positive lenses each include opposite convex surfaces.

9. The lens system of claim 6, wherein the negative lens includes opposite first and second surfaces, with one of the first and second surfaces having a negative radius of curvature and another of the first and second surfaces having a positive radius of curvature.

10. The lens system of claim 6, wherein the first positive lens is formed from plural lens elements coupled together.

11. The lens system of claim 6, wherein the first positive lens has a refractive index greater than 1.7.

12. The lens system of claim 6, wherein the first positive lens has an Abbe number greater than 70.

* * * * *